Oct. 9, 1956            W. S. MARTIN            2,765,920

GRANULAR BED FILTER

Filed June 23, 1951            5 Sheets-Sheet 1

INVENTOR
WARREN S. MARTIN
BY Louis L. Ansart
his ATTORNEY

Oct. 9, 1956  W. S. MARTIN  2,765,920
GRANULAR BED FILTER
Filed June 23, 1951  5 Sheets-Sheet 2
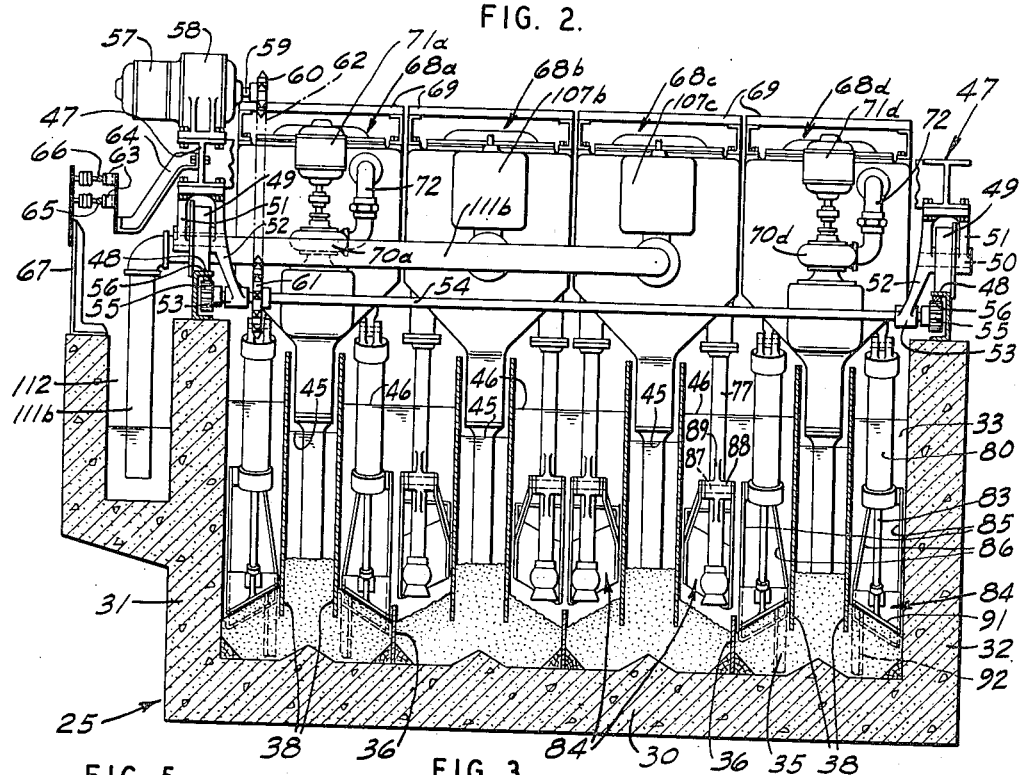
INVENTOR
WARREN S. MARTIN
BY
Louis L. Ansart
ATTORNEY

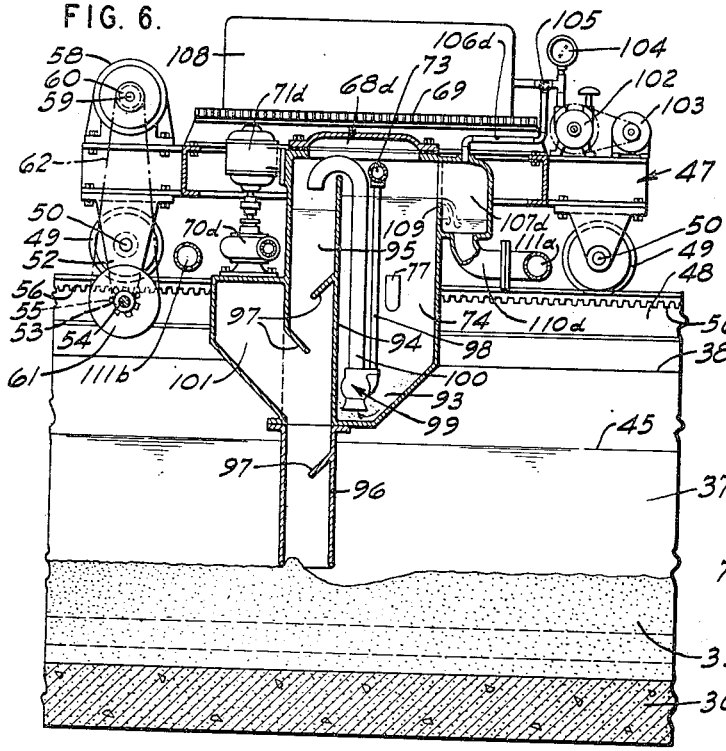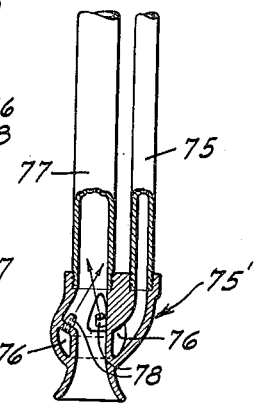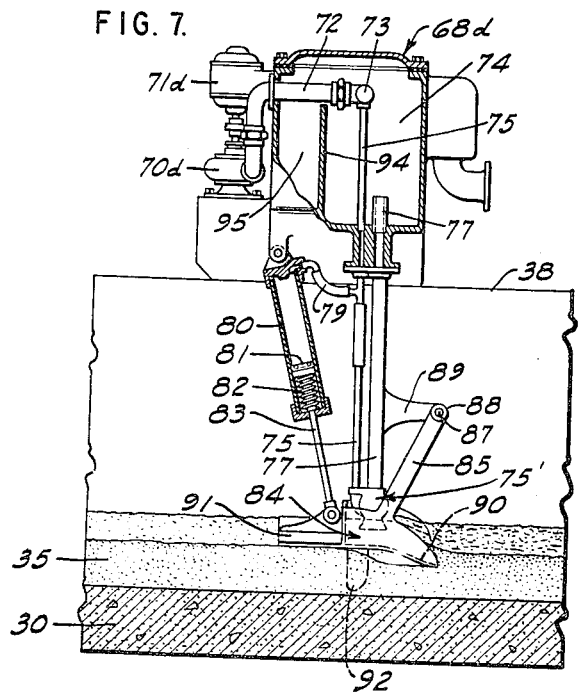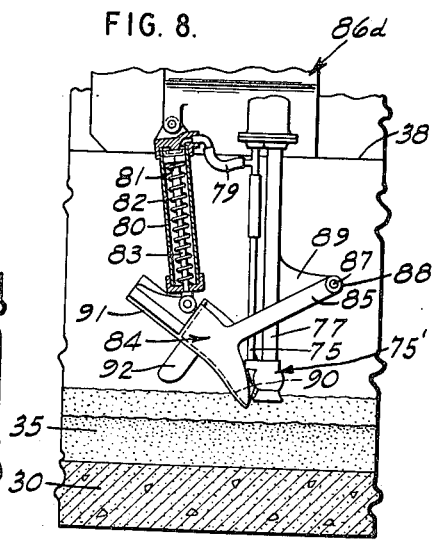

Oct. 9, 1956　　　　W. S. MARTIN　　　　2,765,920
GRANULAR BED FILTER
Filed June 23, 1951　　　　　　　　　　　　5 Sheets-Sheet 4
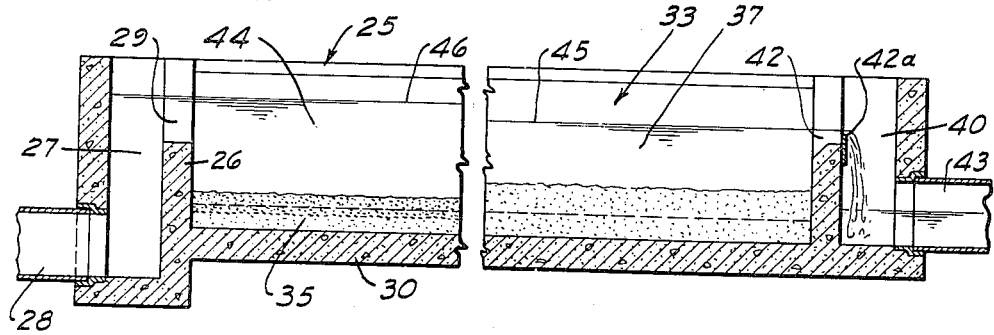
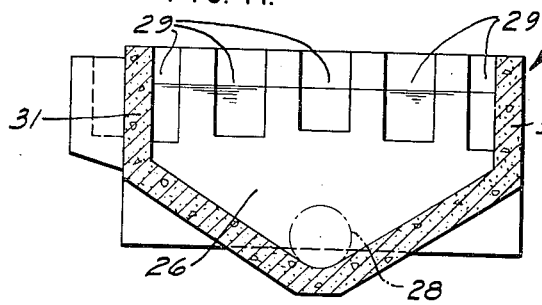
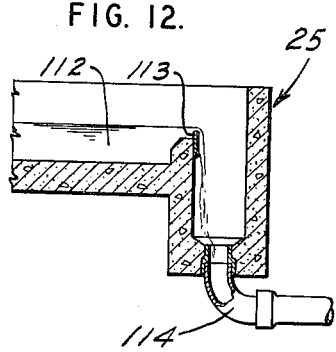
INVENTOR
WARREN S. MARTIN
BY
ATTORNEY Oct. 9, 1956　　　　　W. S. MARTIN　　　　2,765,920
　　　　　　　　　GRANULAR BED FILTER
Filed June 23, 1951　　　　　　　　　　5 Sheets-Sheet 5

INVENTOR
WARREN S. MARTIN
BY
*Louis L. Amart*
*his* ATTORNEY

United States Patent Office 2,765,920
Patented Oct. 9, 1956

2,765,920

GRANULAR BED FILTER

Warren S. Martin, Massapequa, N. Y.

Application June 23, 1951, Serial No. 233,142

20 Claims. (Cl. 210—128)

This invention relates to granular bed filters and particularly to filters adapted for removing detritus and the like from solid bearing liquids such as municipal sewage, industrial wastes, water of water supply systems and the like.

The practice of filtering liquids such as municipal sewage by means of granular bed filters has encountered several difficulties which seems to be prevalent to most methods and arrangements heretofore proposed.

One factor which is inherent to deficient operation lies with the arrangements employing the filter medium, by which a metallic screen member in cooperation with reenforcing screen grids constitutes means confining the filter medium between two vertically opposing channels thereby forming a part of the filter bed itself.

While the qualities of sand make it an excellent medium acting to entrap minute solids in the process of filtering and again releasing the same upon being agitated, the cooperative screen member is less adaptive to washing in the same manner, and the said screen member and particularly the lower part thereof becomes susceptible to a bacterial jelly-like growth which tends to block the liquid flow. Also, due to the character of the granular bed filters it is highly desirable to have quiescent flows throughout the filtering process. In the prior art, various forms of channels have been employed to communicate with the filter bed to gain this end, some of which influence the settling of solids contained by the liquid being handled. As a result the accumulation of settled solids in remote parts of the system is offensive and may render the unit in a septic state.

The prime object of my invention is to provide an improved type of filter, having a granular filter bed adapted to handle liquids bearing a wide variation of quantity and quality of detritus, and means to automatically remove said detritus in concentrated form with unimpaired filtering performance during continuous operation.

An important feature resides in a novel means constituting a filter having a filter bed of granular material without the conventional screen support and without the aid of conduits auxiliary to the filter bed channels.

More specifically, the present invention contemplates a rectangular chamber having a filter bed of granular material such as sand resting on the bottom thereof, the said chamber being divided into two or more adjacent channels by means of relatively thin dividing members extending from end to end of the chamber and from a level above the liquid level therein downwardly to a level above the bottom of the chamber. The said channel dividing members act primarily as a barrier above the filter bed, while the filter medium remains continuous and common between the lower parts of each adjacent channel. Every other channel may be designated as an influent channel, having means to receive the liquid to be filtered; and each of the other channels becomes an effluent channel, having means such as a weir for discharging the effluent and controlling the hydraulic head thereof.

In operation, the liquid to be filtered is supplied to the influent channels. The liquid, filling the sand bed rises into the effluent channels, thereby flowing in a U-shaped course through the sand bed in passing around the members dividing each two opposing channels. The liquid passes through the sand or filter medium into the effluent channels by a natural gravitational force tending to seek the same level as the influent and is discharged over said effluent weirs. The influent supply will provide hydraulic head sufficiently above the effluent weirs to overcome the resistance to hydraulic flow within the filter. The filtering action takes place in a manner similar to other filters of similar nature, in which the greater part of the suspended solids and slimes of the crude liquid are retained on or near the entrance surface of the filter bed and further collection gradually decreases with respect to further passage of the liquid through the filter medium, resulting in a gradual refinement of the liquid being handled while passing through the depths of the bed. Filtering operations may be carried on without attention until the accumulation of solids, collected on the entrance surface of the filter medium, usually for a depth of one-half inch, forms a mat and hinders the normal flow of liquid.

Another object of the present invention is to provide novel means for revivification of the filter bed whereby the said mat is removed by means of a scoop or the like and conveyed to a washing device; wherein the filter medium is washed and returned in a clean state to the effluent side of the filter.

The present invention embodies a form of washing device which cooperates with a relatively small area of the filter bed at a time, and revivification of the entire bed may be carried out by moving the washing device from end to end over the filter bed while in relatively continuous operation thereon. Simultaneously with the said operation, a plow-like member carried by a washing device, cooperating with that portion of the filter medium which remains with the bed, acts to restore the filter bed to its original form with respect to the entrance surface in shifting the bed by an amount equal to that removed with said mat of collected solids. The effluent side being depressed by the shifting action is replenished with fresh or freshly washed filter medium.

An important feature resides in the arrangement and means whereby clean sand is deposited on the effluent side of the filter bed and is intermittently shifted toward the influent side in progressive stages, which coincide with the gradual accumulation of filtered solids. Solids entrained in the influent portion of the filter bed are eventually carried back to the influent side and thereupon removed with said mat comprising collected solids.

Another object of the invention resides in the provision of means whereby products of filtration are separated from the filter medium by multi-stage washing, means for drawing off the said products in a concentrated form and means for returning the clean sand to the filter bed; all of which perform in a continuous operation without interruption of the filtering process.

An important feature resides in the arrangement and means provided within a closed system of the washing device for the application of a syphon system to aid in drawing of the wash water without the danger of continuous flow or backflow during the period when the washer is at rest.

The amount of solids usually entrained by the inner or influent portion of the filter bed does not restrain the liquid flow through the filter bed to any great extent, whereas the accumulation of larger solids on the surface of the bed does increase the resistance to flow, and results in a building up of hydraulic head on the influent side while receiving a relatively constant supply flow. A rise in liquid level in the influent side of the filter under normal conditions is an indication of the condition of the filter bed itself and in the prior art, this condition has been utilized to automatically start and stop the washing operations by means of a single float operated switch. Filtering operations in connection with sewage treatment plants however, encounter a considerable fluctuation in flows, and where there is an increasing demand upon the filter this condition will cause a rise in hydraulic head due to flow irrespective of the condition of the bed, resulting in untimely operation of the said float switch.

Another important object of my invention is to provide an improved type of granular bed filter adapted to handle solid bearing liquid in variable quantitive rates of flow, and having means for automatically separating and drawing off the products of filtration with relatively uniform efficiency.

Another feature resides in the provision of means for controlling the operations of the filter bed cleaner in response to the measured fluctuation in hydraulic resistance of the filter bed caused by the entrained solids. Another feature resides in the means whereby the filter bed cleaner may be operated over all or part of the filter bed periodically or continuously such as may be required to satisfy the filtering conditions. Another feature resides in the arrangement whereby the cleaner operations may be controlled by either manual or automatic means.

Although many forms of apparatus might be employed to control the filter bed cleaning operations, there may be provided in connection wtih the present invention a simplified form utilizing only fundamental principles.

In considering the hydraulic action within a filter of this class, having means such as a weir for controlling the discharge or effluent, the liquid level within the effluent channel is determined primarily by the hydraulic flow over the said weir, while the liquid level in the influent channel is increased over the effluent level by an amount due to the hydraulic resistance of the filter bed. For an assumed condition of the filter bed, say in a relatively clean state, the differential in hydraulic heads between the two opposing channels bear a uniform relation for various volumetric liquid flows, and an increased resistance within the filter bed, as caused by an accumulation of filter solids, will cause a deviation from the normal relation of the two opposing channels.

This hydraulic characteristic has been utilized by the use of a float having a certain lever arm controlled by the liquid level in the effluent channel, a second float similarly controlled by the liquid level in the influent channel, the positions taken by these floats being combined by means of a gear type differential, the spider element of which actuates an electric switch means controlling the filter bed cleaner.

Said two floats may be so connected to the differential that similar movements of both would tend to neutralize their effect upon the spider element and the lever arms of said floats may be of certain proportional length and position so that in response to the liquid levels occurring with the normal relation of the two channels a neutral effect of the differential may be maintained, and, only a deviation from the normal relation of the liquid levels would result to actuate the said control switch.

The nature of the general principles and objects above referred to as well as other objects and advantages will appear upon consideration of the following description and of the drawings illustrating a particular combination and arrangement of parts.

Figure 2 is a vertical transverse sectional view on the line 2—2 of Figure 1.

Figure 3 is an enlarged detail vertical transverse sectional view through the bottom portion of one of the filter units.

Figure 4 is a detail vertical section view through one of the effluent channels illustrating the means for supporting the side walls thereof.

Figure 5 is a top plan view of the detail illustrated in Figure 4.

Figure 6 is a detail vertical longitudinal sectional view substantially on the line 6—6 of Figure 1.

Figure 7 is a detail vertical transverse sectional view substantially on the line 7—7 of Figure 1.

Figure 8 is a detail vertical longitudinal sectional view illustrating the scraper in raised inoperative position.

Figure 9 is a vertical sectional view through the injector, parts being illustrated in elevation.

Figure 10 is a fragmentary vertical longitudinal sectional view on the line 10—10 of Figure 1, the sand scraping and cleaning apparatus being omitted.

Figure 11 is a vertical transverse sectional view on the line 11—11 of Figure 1.

Figure 12 is a detail vertical sectional view on the line 12—12 of Figure 1.

Figure 1:
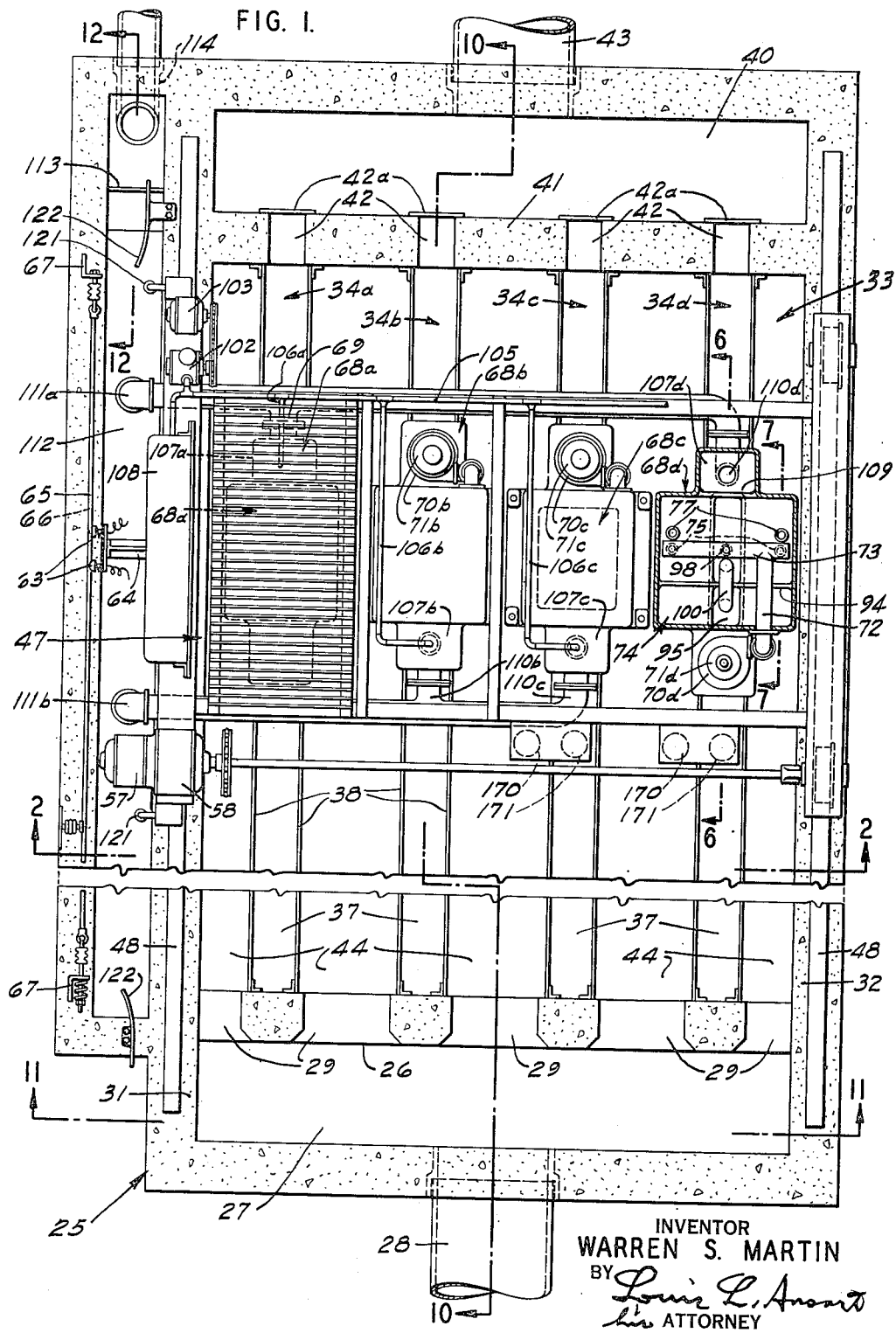
Figure 1 is a top plan view of the apparatus composed of a plurality of filter units, with parts broken away and shown in section.

Referring now in detail to the accompanying drawings, the structural body or tank containing the entire filter and appurtenance is denoted in general by the reference numeral 25 and is shown in Figures 1, 2, 10, 11 and 12. In practice this tank may consist of a rectangular shaped structure in plan, built from concrete or any material most suitable for a particular purpose. The present embodiment discloses four filter units within a common tank structure to illustrate for example a method which may be used to economically provide a required filter area. In a similar manner any number of units may be combined, as required for a particular purpose. In order to supply the influent liquid to all filter units in a uniform manner, the tank 25 has a transverse dividing wall 26 near one end, setting off a receiving chamber 27. The influent liquid may be admitted to the chamber 27 by a single conduit, 28, the said chamber being so constructed as to produce an equal diversion of quiescent flows to each of the filter units through openings 29 in the dividing wall 26.

The portion of the tank following the receiving chamber 27 is best shown in Figure 2, and represents the body of the filter having a substantially flat bottom 30 and side walls 31 and 32 forming a filter chamber 33. In this particular case the chamber 33 is effectively divided off into four filter units which are designated in general by numerals 34a, 34b, 34c and 34d (Figure 1), each of said filter units having a secondary filter bed 35, of material such as sand, resting on the bottom 30 and separated from each adjacent filter bed by a dividing member 36 secured to the said bottom and extending upward to a point slightly above the surface of the filter bed. An effluent channel 37 is provided for each of the corresponding filter units, each channel 37 being formed by two dividing members 38 extending in an upright position from a point below the top surface of the filter bed 35 to a height well above the predetermined liquid levels to be carried. The members 38 forming the effluent channels may be spaced apart and held in position by supports 39 mounted on the bottom 30 as shown in Figures 4 and 5. The said effluent channels are in communication with the central portions of the filter beds across the filter chamber and extend the full width of the chamber 33. The tank 25 has an effluent chamber 40 located at its end remote from the receiving chamber 27 and is divided from the filter chamber 33 by a wall 41 which is provided with weir openings 42 located at the termination of the effluent channels 37. The lower portion of the effluent chamber 40 is provided with a conduit 43 for the discharge of filtered liquid. In forming the effluent channels 37 within the filter chamber 33, other adjacent channels are likewise formed to function as influent channels 44.

In operation, the liquid to be filtered is admitted to the receiving chamber 27 under sufficient hydraulic head to rise upward within the said chamber and flow through the openings 29 into each of the influent channels 44. The said openings 29 may best be located below the minimum operating liquid level of the filter chamber 33, that level being determined by the location of the effluent weirs 42a (Figures 1 and 10). The liquid levels within the filter may provide sufficient depth over the filter beds 35 to accommodate the necessary volumetric flows within the filter channels, without disturbance of the natural settling of the filter bed itself.

The filtering action which takes place within the filter bed is illustrated to advantage in Figure 3, and the relative hydraulic heads of the two opposing channels are shown in Figures 2 and 10. The liquid level 45 (Figures 2 and 10) of the effluent channels being relatively fixed by the discharge weirs 42a, the liquid levels 46 (Figures 2 and 10) of the influent channels may be increased over the level 45 by the supply of influent to the filter.

As illustrated more particularly in Figures 2 and 3, there are two influent surfaces on each filter bed and a single effluent surface. Inasmuch as most of the solids are collected close to the influent surfaces, a larger area is required on these surfaces and as indicated in Figure 3 a much smaller corresponding effluent surface is required. In order to provide for larger influent surfaces and to prevent short circuiting around the lower ends of dividing members 38, which enclose an effluent chamber 37, the adjoining influent surfaces are inclined with their highest portions against such dividing members 38.

In maintaining the filter in continuous operation, the contaminated material at the influent surface is removed when necessary and withdrawn from the influent channels, clean granular material is supplied to effluent channels and the material in the effluent channels is advanced to feed the clean material into the influent channels and restore the influent surfaces to their normal positions.

Preferably the clean granular material supplied to the effluent channels is attained by cleaning or revivifying the contaminated material removed from the influent surfaces. The apparatus for removing the contaminated granular material or sand, washing it and supplying it to the effluent channels may be mounted on a carriage 47 supported on rails 48 on the tops of walls 31 and 32 by wheels 49 rotatable in suitable mountings at the lower part of the carriage 47. As illustrated in Figures 2 and 6, the wheels 49 at each end of the carriage are mounted by means of short shafts 50 in outside brackets 51 and inside brackets 52 projecting downwardly to provide bearings 53 for a transverse shaft 54 carrying at its ends pinions 55 meshing with racks 56 at the lower sides of the top flanges of the rails 48 which are shown in Figure 2 as being of channel cross section. The carriage may be driven from end to end of the tank 33 by means of a motor 57 acting through speed reducer 58, shaft 59, and suitable driving connections between shaft 59 and shaft 54. Suitable connections may include a sprocket wheel 60 on shaft 59, a sprocket wheel 61 on shaft 54 and a sprocket chain 62 passing around said sprocket wheels 60 and 61.

Electric power for operating the motor 57 and other devices to be described hereinafter is supplied to suitable parts of the carriage through spring contacts 63 (Figs. 1 and 2) carried by a bracket 64 projecting from the carriage into engagement with conductors 65 and 66 supported in fixed position at one side of the tank 53 by means of upwardly extending brackets 67. As illustrated in Figure 2, spring contacts 63 are insulated from the bracket 64 and conductors 65 and 66 are insulated from brackets 67.

The apparatus for removing contaminated material from the various influent surfaces, washing this material and discharging it into the effluent channels may be divided into substantially identical cleaning units corresponding to the various filter beds or filter units. Such cleaning units may be designated as 68a, 68b, 68c and 68d (Figure 2) and corresponding parts thereof may be designated by the same numerals but associated with appropriate letters to identify the units. Normally, there are positioned above the units 68a, 68b, 68c and 68d, covers 69 which may be in the form of gratings. In Figure 1 all of the covers 69 except the left hand one have been removed and the upper part of the unit 68d is broken away in order to show underlying structure. As shown in Figure 2, each of the cleaning units is provided with two sets of devices for removing the contaminated granular material from the influent surface of the filter bed and a device therebetween in the effluent channel to restore clean sand to the effluent channel and also to permit the removal of filtered liquid for use in washing the contaminated granular material.

Wash water is withdrawn from the effluent channels taken in order from left to right by means including pumps 70a, 70b, 70c and 70d, and for convenience in arranging the parts, pumps 70a and 70d are mounted in the front (Figure 2), and pumps 70b and 70c are mounted at the rear (Figure 1). These pumps may be driven respectively by motors 71a, 71b, 71c, and 71d.

Referring to Figure 7, the pump 70d of unit 68d forces filtered liquid from the corresponding effluent channel through a pipe 72 to a pipe or manifold 73 extending transversely of the unit 68d inside a chamber 74. From each end of the manifold 73 water is supplied to a downwardly extending duct 75 which passes downwardly through the bottom of the chamber and down to the vicinity of the upper surface of the filter bed in the influent channel where the liquid thus supplied passes into a circumference chamber 76 around a pipe 77 (Figure 9) and inwardly and upwardly through ports 78 into the interior of said pipe or duct 77 provided at its bottom with a wide mouth. Due to this construction, an injector effect may be obtained, and contaminated material scraped from the influent face of a filter section forced upwardly through pipe 77. Inasmuch as the surface of each influent filter-bed surface is lowest adjacent to a dividing member 36 the bottom of the corresponding pipe 77 will be located near a dividing member 36.

Some of the water supplied through pipe 75 is passed from said pipe through a flexible pipe or hose 79 into the upper end of a cylinder 80 hinged at such end to the unit (Figures 7 and 8). In said cylinder is a piston 81 urged upwardly by a spring 82 introduced between the lower end of the cylinder and the piston. Connected to the piston 81 is a piston rod 83 extending through the lower end of the cylinder and pivoted at its lower end to a scraper 84 provided with two upwardly projecting arms 85 and 86 (Figures 2, 7 and 8) which are connected by a pivot 87 to a hub 88 at the end of an arm 89 projecting forwardly from the pipe 77. By this arrangement of the two arms 85 and 86 the pivot 87 connecting the same to the hub 88 provides the proper axis about which the scraper 84 may be swung. When the pressure in the upper end of the cylinder 80 is reduced the spring-loaded piston rises in the cylinder and the scraper 84 is returned to its raised or ineffective position as indicated in Figure 8.

Each scraper is preferably so shaped with a downward curve at its forward end 90 that, when depressed, the forward part of its bottom will project beneath the corresponding inclined influent surface of the granular material and scrape off the layer of sand containing most of the contaminating material, such as waste solids, filtered out of the liquid. It will be seen that the scraper has side walls and a rear wall and the arms 85 and 86 may be continuations of the material of the corresponding sides. Due to the location of the lower end of a tube 77, from which the scraper is supported, near a dividing member 36 the arm 85 may be arranged substantially vertically and the upper end of arm 86 may be dispaced inwardly as indicated in Figure 2. At its rear the scraper is supplied with a suitably inclined presser 91 which tends to smooth out the inclined surfaces of the bed at the rear of the scraper and leave it in the desired form. Each scraper 84 may also be provided with a plow 92 extending downwardly from its bottom, this plow being inclined at one face so as to force the material laterally and assist in feeding the granular material from the effluent channel into the bottom of the influent channel.

When the scraper is in the position shown in Fig. 7 and the cleaning device is in operation, the sand and contaminating material scraped from an influent filter surface will be carried upwardly through a pipe 77 into a chamber 74 and the granular material will pass downwardly to a sump at the bottom thereof. The washed material is returned by means including a pump 99 to the effluent surface of the bed which is in the corresponding effluent channel. The pump 99 is at the bottom of said chamber 74 having at its left (Fig. 6) a vertical wall 94 which is also shown in Fig. 7 and separates chamber 74 from a vertical passage or chamber 95 connected at its bottom to the upper end of a pipe 96, of which the lower end is adjacent to the surface of the sand in the effluent channel. The upright passage 95 and the pipe 96 may be provided with suitable baffles 97 to control the flow of liquid and prevent any passage of sand upwardly therethrough.

Liquid taken from the manifold 73 is supplied through a downwardly extending pipe 98 to jet pump 99 and acts to force the clean sand upwardly through a pipe 100 in substantially the same manner as through pipe 77 to discharge the same over the wall 94 into the vertical passage 95 so that it will fall through such passage onto the effluent surface of the sand in a corresponding effluent channel. It will be seen that the lower end of the pipe 96 tends to smooth the material discharged therefrom on the upper surface of the granular filter bed material in the effluent channel. The pipe 96 through which the cleaned sand is deposited on the surface of the filter bed in the effluent channel, is also used for withdrawing from the effluent channel filtered liquid for use in removing sand from the influent surfaces of the sections of the filter bed and washing it before its return to the effluent surface of an effluent in an effluent channel. As illustrated in Fig. 6 there are three baffles 97 of which the uppermost and lowermost are inclined downwardly and from the wall 94 and the intermediate baffle 97 extends downwardly from the inside of the wall opposite to the wall 94. Immediately beneath this intermediate baffle is the mouth or entrance of a passage or duct 101 through which liquid may pass to the inlet of pump 70d.

In order for filtered liquid to be drawn upwardly from the effluent channel through the pipe 96 and passage 101 by the pump 70d, the liquid in the passage 95 should be kept at a level substantially higher than the entrance of the passage 101. This result may be attained by maintaining a vacuum in the upper part of the chamber 74 and the upper part of passage 95 which communicates with such chamber over the top of wall 94. To this end there may be mounted on the carriage 47, a rotary vacuum pump 102 actuated through a chain and sprocket wheel connection by a motor 103 also mounted on the carriage and provided with a gauge 104, and may be connected to a manifold 105 (Figs. 1 and 6) and branch pipes 106a, 106b, 106c, and 106d, of which the last mentioned communicates with chambers 107a, 107b, 107c and 107d, connected with the upper parts of chambers 74 of which the one included in unit 68d is illustrated. The manifold 105 may also be connected to a vacuum tank 108 adapted to smooth the vacuum action. In this connection, it should be noted that units 68a and 68d are arranged in the same direction and that units 68b and 68c are in reversed position with reference to units 68a and 68d.

At the side of the chamber 74 of the unit 68d opposite the wall 94 (Fig. 6), the liquid may overflow a weir 109 into the chamber 107d and pass therefrom through a branch pipe 110d into a manifold 111a (Fig. 1) discharging into a channel 112 at the opposite side of the apparatus and preferably supported by the wall 31. Said manifold 111a extends across the tank and has a downwardly turned position with its open lower end submerged in the liquid in the channel 112. This dirty liquid or wash water may be discharged from the channel over a weir 113 (Fig. 12) and empty into a discharge pipe 114. The said dirty water contains the products of removal and may be utilized in many ways such as, in treating sewage. It might be returned to the system for further chemical treatment.

Dirty water in unit 68a is discharged through a branch pipe 110a into the manifold 111a, and dirty water in units 68b and 68c are discharged through branch pipes 110b and 110c into a manifold 111b which in turn discharges into channel 112. The weir 113 maintains sufficient liquid in channel 112 to provide submergence for the downturned outlet ends of manifolds 111a and 111b.

Due to the vacuum maintained in the various units 68a, 68b, 68c and 68d, the pipes and manifolds, through which the dirty water is discharged, are kept full of liquid. However, the liquid level in the channel 112 is lower than in the effluent channels 37 and the liquid levels in the chambers 107a, 107b, 107c and 107d will be lower than in chambers 74 which are separated therefrom by weirs 109, and dirty water rising above said weirs 109 will fall downwardly into said chambers 107a, 107b, 107c and 107d and will flow through manifolds 111a and 111b into the dirty water channel 112.

Preferably all of the instrumentalities described are controlled electrically through a system which will now be described. Current may be supplied through the spring contacts 63 which are in contact with the conductors 65 and 66. The spring contacts 63 may be connected to suitable conductors 115 and 116 provided with a double switch 117 whereby gaps in such conductors may be closed or opened. When the apparatus is entirely out of operation, switch 117 will be open but during ordinary operation it will be closed. From conductors 115 and 116 leading to switch 117 current may be used to start and stop the action of the cleaning apparatus when in normal operation under an automatic control described hereinafter, such control being effective for example, to cause operation of the cleaning mechanism when clogging of a filter bed is indicated by excessive difference in level between liquid in the influent channels over liquid in the effluent channels.

Figure 13:
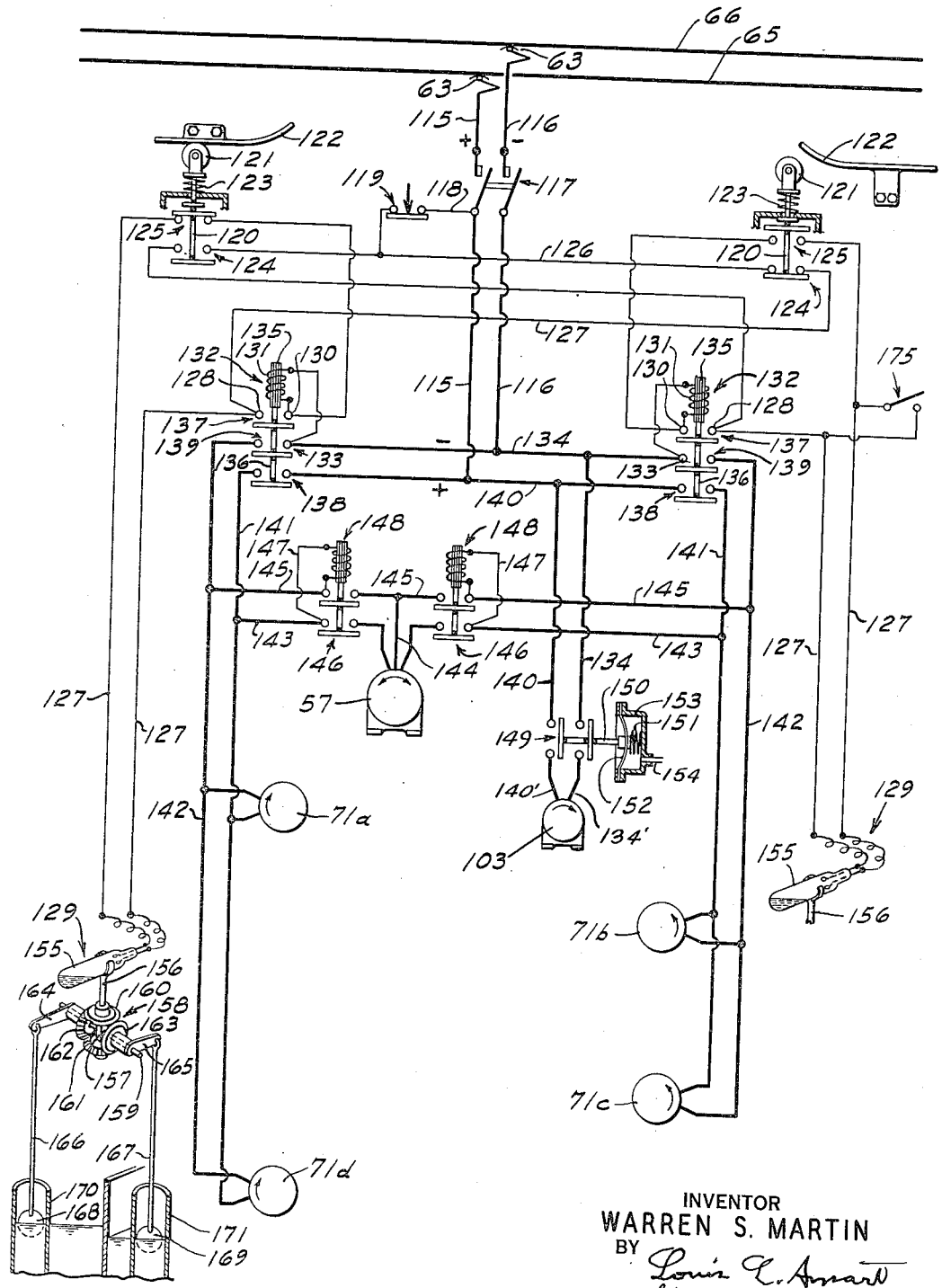
Figure 13 is a diagrammatic view of the automatic electric control for the sand scraping and cleaning apparatus.

As indicated in Figure 13, the carriage 47 is at the left end (Figure 1) of the filter tank 25. As the carriage approaches the end of the travel in this direction, a switch controlling member or rod 120, movably mounted on the carriage may be shifted by engagement of a roller 121 thereon with a fixed limit stop or cam 122 at the left end of the filter tank. Such shifting or forcing back of the member or rod 120 may be effected against the action of a spring 123 and serves to open a switch 124 to stop carriage-driving motor 57, and to close a switch 125 to prepare for reversal of motor 57. At the opposite or right hand end of the tank is a second limit stop or cam 122 which, when the carriage reaches the right hand end of the tank acts on another roller 121 to force back another rod or member 120 to open another switch 124 and close another switch 125. It will be seen that when the carriage is at one end of its travel the corresponding switches 124 and 125 are open and closed respectively and the switches 124 and 125 at the opposite end of the tank are closed and open respectively.

In view of the fact that most of the electrical apparatus is duplicated, such parts thereof which are duplicated will hereinafter be distinguished from each other, when necessary, by referring to them as at the left or at the right in accordance with their arrangement in Figure 13.

During travel of the carriage 47 from the left end of the tank (Fig. 13), the influent surfaces of the filter beds in filter units 34a and 34d will be cleaned and as described hereinafter such movement will be started automatically only by the existence of excessive difference between the heads at the influent surface of the filter bed unit and the effluent surface thereof. In the event that such condition exists and the switches 117 and 119 are closed the current will pass from the conductor 115 which may be considered as a positive conductor through the branch 118 and the closed switch 119 to a conductor 126 having switches 124 at the ends thereof. From the conductor 126 the current will pass from the closed switch 124 at the right of Figure 13 to a conductor 127 provided at an intermediate point with a switch contact 128 and at a point farther along with a switch 129 which may be controlled by suitable means so as to be closed when a predetermined difference of liquid level between the liquid in the influent channel and the liquid in the effluent channel is exceeded. From switch 129 the current passes through an extension of the conductor 127 and through a closed switch 125 to a switch terminal 130 adjacent to switch contact or terminal 128.

Also connected with the switch terminal 130 is one end of a coil 131 of a solenoid forming part of an electromagnetic switch shifting device 132. The other end of the coil 131 is connected to a switch terminal 133 which in turn is connected through a conductor 134 to the negative conductor 116. As illustrated the electromagnetic device 132 is in the form of a solenoid and the energization of the coil 131 by the current passing therethrough will tend to draw through the coil a core 135 and thereby shift a member 136 to close a switch 137 across the terminals 128 and 130 and thus permit the current from the conductor 127 to pass from terminal 128 to 130 and through the coil 131 so that the coil 131 will remain energized even if switch 125 or 129 be opened. Shifting of the member 136 will also close a switch 138 and a switch 139. Current passing from the positive conductor 115 through a conductor 140 will pass through closed switch 138 to a conductor 141 and supply current to motors 71a and 71d to operate pumps 70a and 70d respectively. From the motors 71a and 71d the current passes to a conductor 142 which leads to the switch 139 which is closed at this time. The current from the conductor 142 therefore passes through the switch 139 to the conductor 134 and to the negative conductor 116. From the conductor 141 the current also passes through a line 143 to supply power to the motor 57 which drives the carriage. From the motor 57 the current may pass through a conductor 144 to a conductor 145 leading to the conductor 142 so as to cause the motor 57 to be turned counterclockwise.

In the conductors 145 and 143 between the conductors 141 and 142 and motor 57 is a double switch 146 which is normally open but may be closed by means of current passing through a conductor 147 connecting the two conductors 143 and 145 and actuating a solenoid 148 to close the double switch 146. Operation of the motor 57 will cause the carriage 47 to travel to the right and cause the left hand roller 121 to ride off the end of the left hand limit stop 122, thus permitting the left hand spring 123 to open the switch 125 and close the switch 124 thus breaking the starting circuit through the left hand switch 125. There will be no further shifting of switches, however, until the carriage 47 travels far enough to the right to bring the corresponding roller 121 into engagement with the corresponding right hand limit stop 122 and cause the right hand switch member 120 to be forced back against the action of the corresponding spring 123 to close right hand switch 125 and open right hand switch 124 thus breaking the circuit through the conductor 127 and causing the opening of switches 137, 138, 139 and 146. If the right hand switch 129 be closed at this time, the current will act in the same manner on the switches at the right in Figure 13 and start the carriage towards the left.

The motor 103 of the vacuum pump 102 also may be operated by current from this system and to this end current may be supplied to the motor 103 through a conductor 140' connected with the conductor 140 and after passing through the motor may be returned through a conductor 134' to the line 134 and therethrough to the negative conductor 116. In order to operate the motor 103 only when the vacuum in the tank 108 has been too much reduced, there may be provided in the lines 140' and 134' a double switch 149 which may be controlled from the vacuum tank. This result may be obtained by urging a switch controlling member 150 to a switch closing position by means of a spring 151 and returning the rod 150 to switch opening position by vacuum producing means. This return may be produced by having the rod 150 fastened in a diaphragm 152 extending across one end of a cup shaped member 153 in which the spring 151 is housed, the interior of the cup member 153 being connected through a duct 154 with the interior of the vacuum tank 108. It will be evident that when the vacuum is sufficiently strong, the diaphragm 152 will be drawn into the cup 153 against the action of the spring 151 and the switch 149 will be opened. When the vacuum falls the spring 151 will act to close the switch 149 and again start the vacuum pump.

Inasmuch as the beds of the filter units 34a and 34d are cleaned during the movement of the carriage from left to right and the beds of the filter units 34b and 34c are cleaned during the movement of the carriage from right to left, the left hand switch 129 must be regulated by conditions in either of the filter sections 34a and/or 34d and the cleaning of the beds of the filter sections 34b and 34c must be controlled through conditions in these units. One form of apparatus for controlling the left hand switch 129 is illustrated at the left in Figure 13. As illustrated, the switch is of the mercury type and includes a tube 155 into which project at one end the terminals of different parts of the conductor 127. When the end containing the terminals is raised, mercury in the tube is located in the other end of the tube but when the end containing the terminals is depressed, the mercury flows to that end of the tube and closes the circuit through said terminals.

The tube 155 may be mounted on the end of a rod 156 connected with a spider 157 of a differential 158. The spider 157 is mounted on a shaft 159 rotatably supported from the carriage 47. Above and below the central part of the spider are bevel gears 160 and 161 and mounted on the shaft 159 at opposite sides of the spider 157 are bevel gears 162 and 163 which mesh with both gears 160 and 161. Generally horizontal arms 164 and 165 are rigidly connected to the two gears 162 and 163 respectively, and their outer ends are pivotally connected to the upper ends of links 166 and 167 provided at their bottoms with floats 168 and 169 respectively, the float 169 being supported by the liquid in the effluent channel of the filter unit 34d and the float 168 being supported by the liquid in the left hand influent channel of the filter unit 34d. Inasmuch as the variations of the liquid level in the influent channel are greater than those in the effluent channel, the arm 165 is made shorter than the arm 164 in order to keep the liquid head differential within desired limits. The arrangement may be such that the effective lengths of arms 164 and 165 may be varied to suit different conditions. Preferably the floats 168 and 169 are mounted in guides or cages 170 and 171 respectively, which may be in the form of open-ended tubes and may be supported from the carriage 47 in positions over the bed of filter unit 34d, as indicated in dotted lines at the right of Fig. 1. Also the action of the right hand switch (Fig. 13) may be controlled by conditions in filter unit 34c and may be carried by the part of carriage 47 over filter unit 34c. Inasmuch as the filter beds in units 34a and 34d are cleaned at the same time, they will be maintained in substantially the same condition and it is unnecessary to test conditions in both of them. This is also true as to units 34b and 34c.

It will be evident that if both bevel gears 162 and 163 are turned in opposite directions at the same rate, the gears 160 and 161 will be turned freely about the rod 156 and the rod 156 will not be moved about the axis of shaft 159. If, however, the bevel gear 162 is turned more rapidly than the bevel gear 163 by upward movement of said rods 166 and 167, the rotation of the gear 162 will cause gears 160 and 161 to travel along the gear 163 and swing the spindle 159 and shift the rod 156 to cause the mercury to close the gap between the contacts in the tube 155. When the differential head is decreased to a predetermined amount, the tube 155 will be rocked in the opposite direction sufficiently to break the electrical connection between the terminals.

It will be evident that motor 57 cannot be driven to start travel of carriage 47, from the left end of its path until left hand switch 129 (Figure 13) is closed, and that the branch circuit containing this switch would be broken at switch 125 as soon as left hand roller 121 is disengaged from left hand limit stop 122. However, notwithstanding the opening of left hand switch 129, the motor 57 and other parts are driven through other connections until the carriage reaches its limiting right hand position. Then, if the right hand switch 129 be closed, the carriage will travel to the left until stopped at its left hand limiting position. This operation will be carried on until the switch 129 at one end is open at the time the carriage reaches that end. The cleaner devices will then be thrown out of operation. As the carrier is operated in one direction the first and fourth beds will be cleaned and as the carriage moves in the opposite direction and other two beds will be cleaned. A manual switch 175 may be provided to close a shunt across the two parallel parts of line 127 at the right of Fig. 13, thus rendering the right hand switch 129 ineffective for carriage control and the carriage 47 will stop only at the left end of its path.

In recapitulation, the operation is as follows:

Sewage to be treated is introduced through the conduit 28 into the bottom of the receiving chamber 27 and passes therefrom through openings 29 in the upper part of the transverse influent channels 44 between the vertical dividing members or walls 38 extending to the transverse wall 41 near the effluent end of the tank. From the influent channels 44 the fluid passes through the sand beneath the dividing members 38 into the effluent channels 37.

As disclosed hereinbefore there are four filter units having filter beds 38 separated from each other by dividing members 36 located medially of the bottoms of the intermediate influent channels which are substantially twice the width of the side influent channels. As a result of this arrangement liquid flowing out from the effluent surface in an effluent is made up of liquid entering the sand through inclined influent surfaces at opposite sides of such effluent channels. From the effluent channels, the filtered effluent passes through openings 42 into the effluent chamber 40 from which it is discharged through conduit or duct 43.

In order to maintain continuous operation and to insure suitable cleaning operation the contaminated sand at the surface of the influent filter bed portions is scraped off and removed and clean sand is restored to the outlet or effluent surface of the sand, that is, the part of the sand in the effluent channels. The clean sand introduced into the effluent channels tends to raise the level of the sand in the effluent channels and to force the sand gradually into the influent channels with the aid of the shifting plows 92 so as to maintain the normal levels. The sewage solids are collected on the surface of the sand in the influent channels and in order to prevent too great concentration and clogging, the influent surfaces are made of greater area than the effluent surfaces.

In the illustrated form of apparatus, the influent channels, except those at the sides of the tank, are substantially twice as wide as the effluent channels and the beds are all of the influent channels except the end channels are divided into two parts by upwardly extending dividing members 36, thus providing an arrangement in which each effluent channel receives filtrate obtained from liquid supplied through the influent filter bed surfaces on opposite sides of the channel, increased area of influent surfaces being obtained preferably by maintaining the influent surfaces in inclined position sloping downwardly from dividing members 38 to dividing members 36 except at the side influent channels where the influent surfaces slope downwardly to the side walls.

The cleaning of the influent surfaces and the supply of clean sand to the effluent surfaces may be effected by scraping from the influent surfaces the sand with sewage solids entrapped therein, washing the sand and returning the sand thus cleaned to the effluent faces in the filter bed.

The cleaning of the sand in the influent channels of the sections shown in Figure 2 is effected by means of four cleaning devices 68a, 68b, 68c, 68d, mounted on the carriage 47 which may travel from end to end of the main tank. The cleaning devices 68a and 68d operate during movement of carriage 47 to the right (Figs. 1 and 13) and cleaning devices 68b and 68c operate during movement of carriage 7 in the opposite or leftward direction.

With the carriage at the left hand limit of its travel (Fig. 13) and switch 117 closed, closing of switch 129, due to clogging of the filter, will cause coil 131 to be energized to shift member 136 and close switches 137, 138 and 139. The closing of switches 138 and 139 starts motors 71a and 71d and closes a double switch 146 to start motor 57 to drive the carriage toward the other or right hand end of the tank. The closing of switch 137 closes a holding circuit which keeps the coil 131 energized regardless of any opening of left hand switch 125 by movement of the carriage to the right, or of left hand switch 129 due to completion of a cleaning operation will be broken only when right hand switch 124 is opened by movement of the carriage to its extreme right hand position.

As illustrated in Figs. 6, 7, 8 and 9, the operation of the motor 71d of cleaning unit 68d effects operation of pump 70d to draw up water from the corresponding effluent channel and force it through a pipe 72 to a transverse manifold 73 to supply water to side pipes 75 to lower the corresponding scrapers 84 to take up surface sand with entrapped solids, and to produce an injector effect at the lower end of pipes 77 to lift the contaminated sand and discharge it into chamber 74 where it passes downwardly to a central sump 93. The lowering of the corresponding scrapers 84 lowers the corresponding plows 92 and as the scrapers peel off the material at the influent surfaces the plows shift the sand so as to assist in the movement of clean said from the effluent channel to the influent channels. The pressures at the rear of the scrapers act to keep the influent surfaces at the desired inclination.

Water from the manifold 73 is also supplied through the pipe 98 to a pump 99 in sump 93 and forces the sand in the sump upwardly through pipe 100 and over the wall 94 into the upper part of the vertical passage 95 through which and the pipe 96 it falls past baffles 97 onto the sand in the corresponding effluent channel. From the lower part of passage 95 liquid is drawn through duct or passage 101 to the pump 70d, the liquid in the passage 95 being kept at a level substantially higher than the entrance of the passage 101 by maintaining a vacuum in the upper parts of chamber 74 and passage 95 by means including the vacuum pump 102. The dirty liquid over-flows weir 109 and is discharged into the channel 112 through connections including manifold 111a.

The foregoing description of operation of cleaning unit or device 68d applies equally well to the other units 68a, 68b and 68c. When the carriage reaches the right hand end of its path (Fig. 13) the right hand switch 124 is opened thus opening the left hand switch 137 and the corresponding holding circuit and throwing motors 71a, 71d and 57 out of operation. However, right hand switch is closed and, if right hand switch 129 be closed, the carriage will move to the left and cleaning units 68b and 68c will be operated.

Unless switch 117 be opened manually the operation of the cleaning means will continue until one of the switches 129 is opened when the carriage reaches that end of the apparatus.

Other types of sand washers may be advantageous for particular applications and may be used herefore to restore or revivify various filter materials without departing from the prime features and advantages of the present invention.

It should be understood that various changes may be made and that certain features may be used without others without departing from the true spirit and scope of the invention.

What is claimed is:

1. Filtering apparatus comprising a filter bed tank haviing side walls and a bottom containing a bed of granular filter material spreading over the lower part thereof, two walls projecting downwardly into said tank and separating said bed into a central effluent part and side influent parts, a filter bed cleaner traveling over said tank comprising means to scrape contaminated granular material from the surfaces of said side parts, clean the same and deposit the cleaned granular material on the surface of said effluent part; and means correlative with said cleaner for progressively shifting the filter material of said bed from the effluent part to the side influent parts to maintain corresponding uniform filter surfaces at said influent parts.

2. Filtering apparatus comprising a plurality of granular filter bed sections arranged side by side within a tank having side walls and a bottom on which said filter bed sections rest, walls projecting upwardly from the tank bottom and separating said filter bed sections, two walls projecting downwardly into each of said filter bed sections dividing it into a central effluent part and side influent parts, all of said walls extending in a parallel relation, a filter bed cleaner traveling back and forth over said filter beds comprising an individual cleaner for each of said bed sections, each individual cleaner comprising means for scraping filtered material and said granular material from the surface of the corresponding influent parts, a washer for receiving said scrapings and washing said granular material, depositing the washed granular material in said corresponding effluent part and discharging separately said filtered material; and means correlative with said scraper for progressively shifting the granular material of each filter bed section from said effluent parts to maintain a uniform filter surface at each corresponding influent part.

3. Filtering apparatus according to claim 2 including means for rendering each of said individual cleaners operative during movement of said filter bed cleaner in one direction and ineffective during movement thereof in the opposite direction.

4. Filtering apparatus according to claim 3 wherein some of said individual cleaners are operative during movement of said filter bed cleaner in one direction and other individual cleaners are operative during movement in the opposite direction.

5. A filtering apparatus comprising a filter chamber separated by a downwardly projecting wall but spaced from the bottom thereof dividing said chamber into an influent channel and an effluent channel, a bed of filter sand filling the lower parts of said chamber and the space under said wall, means for producing a differential head of liquid to cause a flow thereof through said bed from said influent channel to said effluent channel, means for progressively reconditioning said filter bed comprising a sand washer and a scraper supported by a carriage mounted for travel along said bed, a pipe extending downwardly from said washer, a jet pump on the lower end of said pipe, a pressure fluid tube to supply fluid for operating the pump, a scraper to direct contaminated material from the surface of said sand of said influent channel to the pump, and a mounting for said scraper to control movement thereof back and forth between an effective position beneath said pump and an ineffective position above said influent surface; means for supplying clean sand to said effluent channel, and means correlative with said scraper for progressively shifting the sand of said bed from said effluent channel to maintain a uniform filter surface at said influent channel.

6. Apparatus according to claim 5 wherein said scraper and said shifting means is biased to move to said ineffective position and is moved to effective position by means operated by pressure fluid from the source of supply of pressure fluid to operate said pump.

7. Filtering means comprising a tank containing a granular filter bed resting on the bottom thereof, a wall projecting downwardly into said bed to separate it into an influent part and an effluent part with a connecting part beneath the lower edge of said wall, and means for maintaining said filter bed in condition for continuous filtration comprising a traveling cleaner having a pipe to conduct upwardly contaminated material separated from the surface of said influent part, a jet pump connected to the lower end of said pipe, a second pipe to supply water under pressure to operate said pump, a scraper to remove contaminated granular material from said influent surface and present it to the pump, a mounting for said scraper providing movement thereof between an effective position beneath the pump and an idle position above the influent surface, means for controlling such positioning of said scraper, means for supplying clean sand to said effluent channel; and means correlative with said scraper for progressively shifting the said filter material of said bed from said effluent part to maintain a uniform filter surface at said influent part.

8. Filtering means according to claim 7 wherein said means for controlling such positioning of said scraper comprises spring means urging said scraper to ineffective position and means responsive to water pressure in said second pipe to move said scraper to effective position.

9. Filtering means according to claim 7 wherein said scraper is pivotally supported on said pipe carrying the pump and the means for controlling the positioning of the scraper comprises a link connected to the scraper at one end and having a piston at its other end, a cylinder having a closed end, a fixed pivot on which said closed end is mounted, said piston fitting in said cylinder, a second cylinder head through which said link passes, a spring interposed between said piston and said second cylinder head, and a connection between said second pipe and said cylinder at the opposite side of the cylinder from the spring.

10. Filtering means according to claim 7 wherein said mounting for the scraper comprises arms extending forwardly and upwardly from the sides of said scraper, a bracket projecting forwardly from said first-mentioned pipe and a pivot connecting said arms and said bracket.

11. Filtering apparatus comprising a filter chamber separated by two downwardly projecting walls into a central effluent channel and two influent channels at opposite sides thereof, a granular filter bed extending beneath said walls into all of said channels, and a filter bed cleaner reciprocable along said channels comprising a hollow body closed at the top and narrow transversely to extend downwardly into said effluent channel but flared outwardly to overhang said walls and said influent channels and flared longitudinally of said effluent channel, a transverse wall separating said hollow body into a receiving chamber for contaminated material from the bed and a discharge chamber contracted toward its lower part into a tube to discharge washed material into said effluent channel adjacent the effluent surface of said bed, means including two jet pumps for supplying contaminated material from said influent channels to said receiving chamber through the overhanging parts of said body, means including a jet pump for transferring granular material from the bottom of said receiving chamber over said transverse wall into said discharge member, and a discharge for dirty water at the opposite side of the receiving chamber.

12. Filtering means according to claim 11 in combination with vacuum-producing means connected to the upper part of said hollow body to raise the liquid level therein.

13. Filtering means according to claim 11 in combination with means including a pump on said cleaner to draw effluent from said effluent channel and operate said jet pumps.

14. Filtering means according to claim 11 in combination with a second tube connected to an intermediate part of said tube discharging granular material into said effluent channel, and means including a pump to draw clean water from said discharge tube and use the same to operate said jet pumps.

15. Filtering means according to claim 11 in combination with a second tube branching upwardly from an intermediate part of said discharge tube, means including a pump connected to said second tube to draw clean water therethrough and supply water under pressure to operate said jet pumps, and downwardly inclined deflectors projecting from the inner surface of said discharge chamber and discharge tube extending downwardly therefrom.

16. A filtering apparatus comprising a chamber having a dividing wall but spaced from the bottom thereof separating said chamber into an influent channel and an effluent channel, said chamber having side walls extending in a parallel relation with said dividing wall, a bed of granular filter material filling the lower parts of said chamber and the space under said dividing wall, means for producing a differential head of liquid to cause a flow thereof through said bed from said influent channel to said effluent channel, means for progressively reconditioning said bed comprising a scraper and a washer travelling along said channels in a reciprocating manner while removing to said washer the top layer of filtered matter and filter material from the surface of said bed in said influent channel, said washer comprising means to wash said filter material from said filtered matter, depositing said washed filter material in said effluent channel and discharging separately said filtered matter; and means for progressively shifting said filter material from said effluent channel to maintain a uniform filter bed surface at said influent channel.

17. A filtering apparatus according to claim 16 wherein the said bed of filter material at said influent channel is maintained with a variable depth in the transverse plane with the deepest part adjacent to said suspended wall.

18. A filtering apparatus according to claim 16 wherein said means comprising a scraper and a washer travelling along said channels is electrically power operated and is selectively operated by a float actuated switch, said float actuated switch responding with the correlative variation of liquid head between that of said influent channel and that of said effluent channel.

19. A filtering apparatus according to claim 16 wherein said means comprising a scraper and a washer travelling along said channels is electrically power operated and is selectively operated by a float actuated switch responding with the correlative variation of the liquid of said influent channel.

20. A filtering apparatus comprising a chamber having two dividing walls but spaced from the bottom thereof separating said chamber into a central effluent channel and two side influent channels, said chamber having side walls extending in a parallel relation with said dividing walls, a bed of granular filter material filling the lower part of said chamber and the space under said dividing walls, means for producing a differential head of liquid to cause a flow thereof through said bed from said influent channels to said effluent channel, means for progressively reconditioning said bed comprising two scrapers and a washer for travel along said channels in a reciprocating manner while removing to said washer the top layer of filtered matter and filter material from the surfaces of said bed in both said influent channels, said washer comprising means to wash said filter material from said filtered matter, depositing said washed filter material in said effluent channel and discharging separately said filtered matter; and means for progressively shifting said filter material from said effluent channel to maintain uniform filter bed surfaces at said influent channels.

References Cited in the file of this patent

UNITED STATES PATENTS

| | | |
|---|---|---|
| 659,916 | Davis | Oct. 16, 1900 |
| 845,744 | Blaisdell | Mar. 5, 1907 |
| 1,007,929 | Deacon et al. | Nov. 7, 1911 |
| 1,045,830 | Gates | Dec. 3, 1912 |
| 1,111,857 | Pike | Sept. 29, 1914 |
| 1,554,129 | Ryan | Sept. 15, 1925 |
| 1,620,431 | Bramwell | Mar. 8, 1927 |
| 1,789,961 | Astrom | Jan. 27, 1931 |
| 2,134,114 | Elliott | Oct. 25, 1938 |
| 2,156,291 | Hurt | May 2, 1939 |
| 2,327,726 | Lose | Aug. 24, 1943 |